United States Patent
Hsu

(10) Patent No.: US 7,728,883 B2
(45) Date of Patent: Jun. 1, 2010

(54) METHOD FOR ENABLING OUTPUT DEVICE TO EMULATE COLORS OF TARGET CAMERA

(75) Inventor: Wei Hsu, Taoyuan County (TW)

(73) Assignee: Primax Electronics Ltd., Neihu, Taipei (TW)

( * ) Notice: Subject to any disclaimer, the term of this patent is extended or adjusted under 35 U.S.C. 154(b) by 961 days.

(21) Appl. No.: 11/464,210

(22) Filed: Aug. 14, 2006

(65) Prior Publication Data

US 2007/0268378 A1 Nov. 22, 2007

(30) Foreign Application Priority Data

May 19, 2006 (TW) ............................ 95117797

(51) Int. Cl.
 *H04N 9/73* (2006.01)
(52) U.S. Cl. .................. 348/223.1; 348/187; 348/188
(58) Field of Classification Search .................. None
 See application file for complete search history.

(56) References Cited

U.S. PATENT DOCUMENTS

| 6,256,062 B1* | 7/2001 | Endo ................. 348/223.1 |
| 6,724,423 B1* | 4/2004 | Sudo ................. 348/188 |
| 2004/0190019 A1* | 9/2004 | Li et al. ................. 358/1.9 |

* cited by examiner

*Primary Examiner*—David L Ometz
*Assistant Examiner*—Angel L Garces-Rivera
(74) *Attorney, Agent, or Firm*—Winston Hsu

(57) ABSTRACT

A method for enabling an output device to emulate colors of a target camera includes the following steps: (a) utilizing the target camera to shoot a color chart to obtain a first plurality of output values respectively corresponding to a plurality of color patches of the color chart, (b) utilizing the output device to shoot the color chart to obtain a second plurality of output values respectively corresponding to the plurality of color patches of the color chart, (c) comparing the first plurality of output values with the second plurality of output values to deduce a color transform matrix, and (d) applying the color transform matrix in an image processing pipeline of the output device to enable the output device to emulate colors of the target camera.

7 Claims, 4 Drawing Sheets

METHOD FOR ENABLING OUTPUT DEVICE TO EMULATE COLORS OF TARGET CAMERA

BACKGROUND OF THE INVENTION

1. Field of the Invention

The present invention relates to colors of digital cameras, and more particularly, to a method that enables an output device to emulate colors of a target camera.

2. Description of the Prior Art

Digital cameras are a kind of electrical product that have a great sales volume. There are a lot of types of digital cameras available on the market. When a consumer wants to choose one digital camera from the numerous types, there are some criteria allowing the consumer to make a purchase decision. For example, resolutions and colors of digital colors constitute two different criteria.

Resolutions of digital cameras are a relatively objective criterion allowing consumers to compare different cameras. In short, the resolution of a digital camera referrers to how many image details the digital camera can provide when there is a specific distance between the camera and a photographing target. The better the resolution, the more detail the digital camera can provide. Therefore, digital cameras with high resolutions can be used to take very detailed pictures, while digital cameras with low resolutions can only provide blurred pictures.

Colors of digital cameras are a relatively subjective criterion for consumers to compare. Digital cameras of different brands often have different colors. Briefly speaking, for the same photographing target, for example a color chart under a fixed color temperature, pictures taken by different camera models will have different colors. One consumer may favor the colors of NIKON 4500 digital cameras while another consumer may favor the colors of SONY F828 digital cameras.

With the related techniques, one digital camera is not allowed to emulate the colors of other different cameras. In other words, a user of a NIKON 4500 digital camera cannot use it to take pictures that have colors similar to that of pictures took by a SONY F828 digital camera.

SUMMARY OF THE INVENTION

One of the objectives of the present invention is to provide a method that enables an output device to emulate colors of a target camera.

An embodiment of the present invention discloses a method that enables an output device to emulate colors of a target camera. The method comprises the following steps: (a) utilizing the target camera to shoot a color chart to obtain a first plurality of output values respectively corresponding to a plurality of color patches of the color chart, (b) utilizing the output device to shoot the color chart to obtain a second plurality of output values respectively corresponding to the plurality of color patches of the color chart, (c) comparing the first plurality of output values with the second plurality of output values to deduce a color transform matrix, and (d) applying the color transform matrix in an image processing pipeline of the output device to enable the output device to emulate colors of the target camera.

These and other objectives of the present invention will no doubt become obvious to those of ordinary skill in the art after reading the following detailed description of the preferred embodiment that is illustrated in the various figures and drawings.

DETAILED DESCRIPTION

Any kind of output device that can express colors, such as digital cameras and printers, can use the method of the present invention. For illustrating the method, in the following paragraphs a first camera is used as an example of the output device. Briefly speaking, the method enables the first camera to emulate the colors of a target camera. In other words, after the method is performed, colors in pictures taken by the first camera approximate colors in pictures taken by the target camera.

Figure 1:
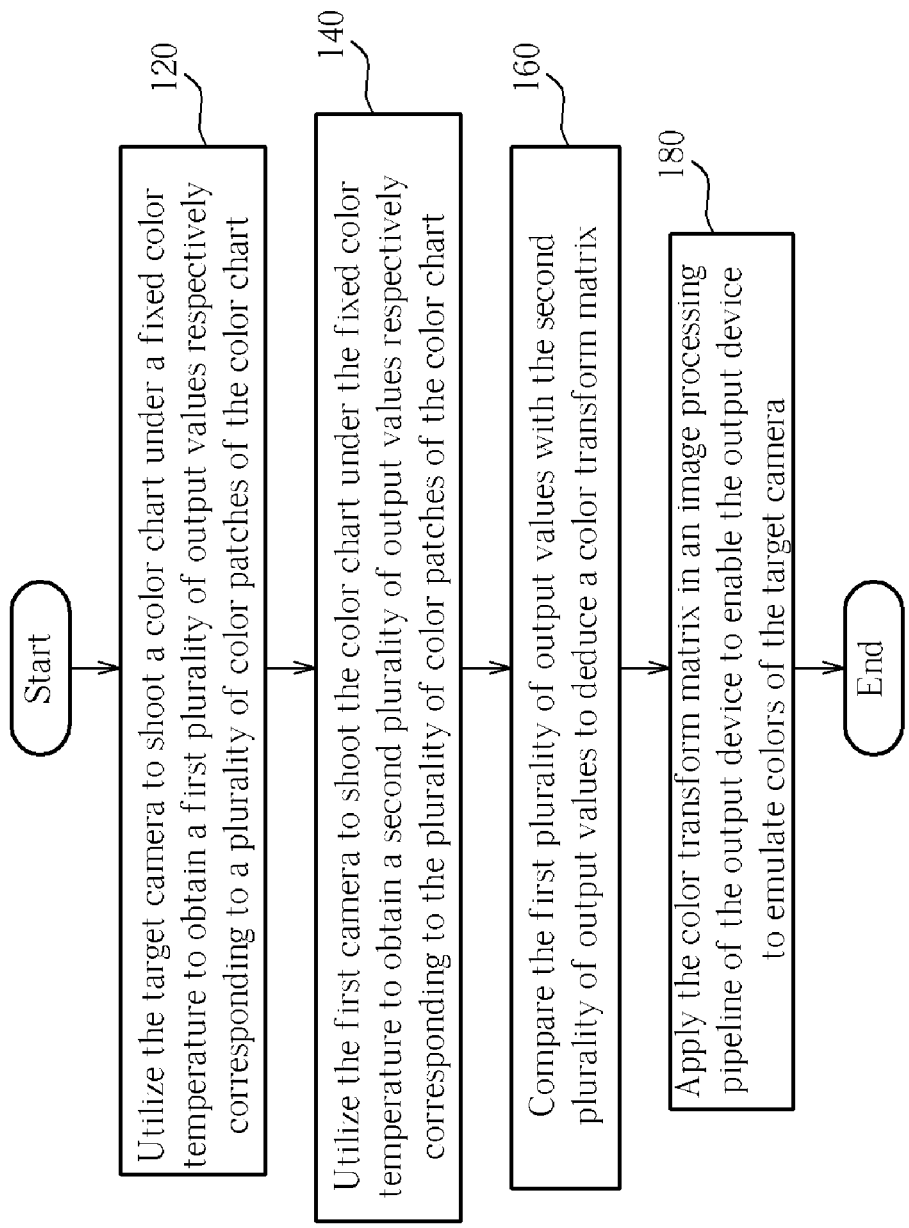
FIG. 1 shows a flowchart according to an embodiment of the present invention.

FIG. 1 shows a flowchart of a method according to an embodiment of the present invention. The flowchart shown in FIG. 1 includes the following steps:

Step 120: Utilize a target camera to shoot a color chart under a fixed color temperature to obtain a first plurality of output values respectively corresponding to a plurality of color patches of the color chart.

Step 140: Utilize a first camera to shoot the color chart under the fixed color temperature to obtain a second plurality of output values respectively corresponding to the plurality of color patches of the color chart.

Step 160: Compare the first plurality of output values with the second plurality of output values to deduce a color transform matrix.

Step 180: Apply the color transform matrix in an image processing pipeline of the output device to enable the output device to emulate colors of the target camera.

Please note that in the aforementioned shooting behaviors, it's preferred that the shooting targets be placed under a fixed color temperature. For example, a light booth can be used to provide a fixed color temperature and to avoid other light sources from interfering.

Figure 2:
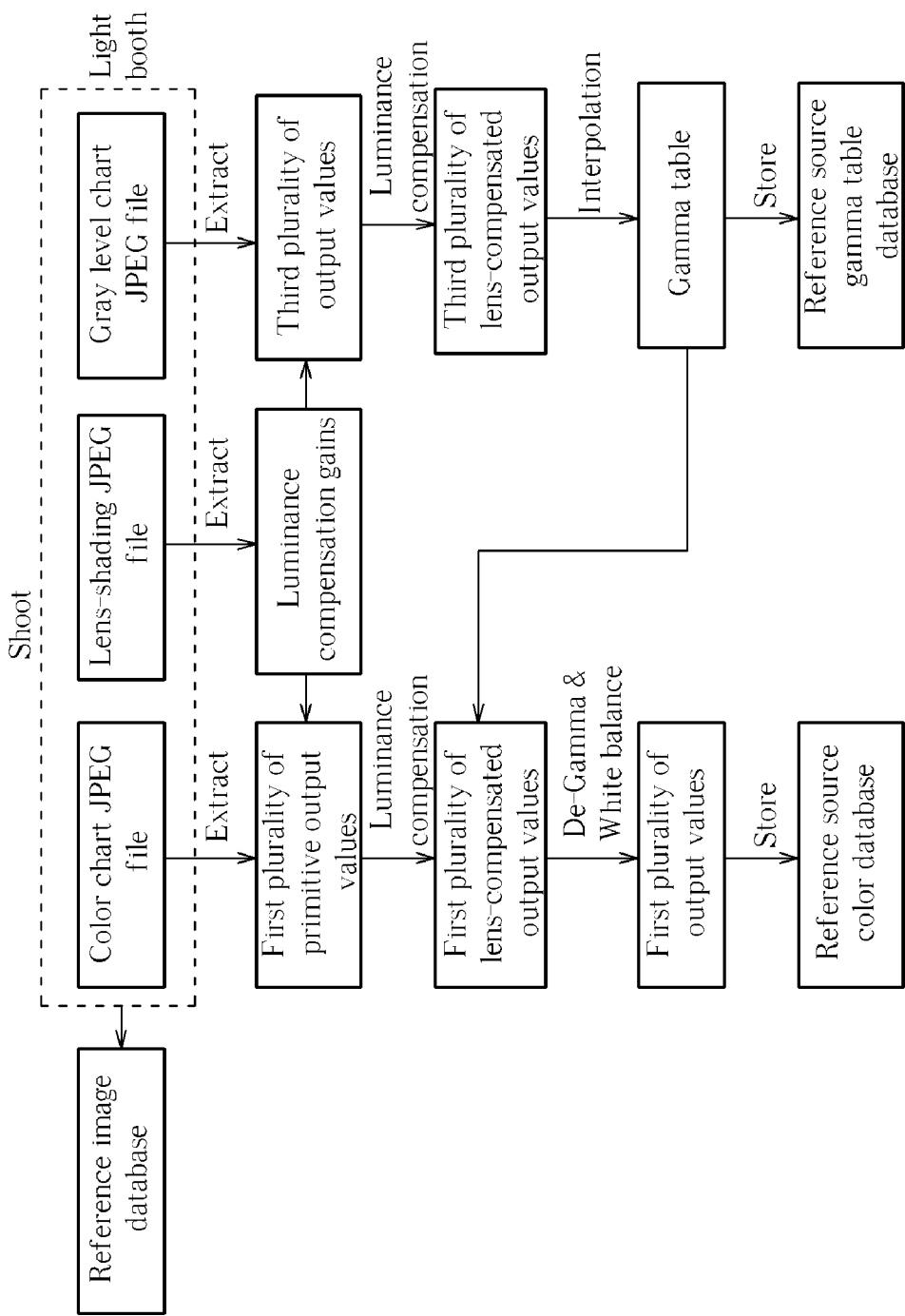
FIG. 2, FIG. 3, and FIG. 4 are schematic diagrams illustrating the steps of FIG. 1 in more detail.

FIG. 2 is a schematic diagram illustrating step 120 of FIG. 1 in more details. First, under the fixed color temperature provided by the light booth, the target camera is utilized to shoot the color chart to obtain a color chart Joint Photographic Experts Group (JPEG) file, to shoot a gray level chart to obtain a gray level chart JPEG file, and take a lens-shading photo to obtain a lens-shading JPEG file. The color chart JPEG file, the gray level chart JPEG file, and the lens-shading JPEG file as a whole are referred to as a reference image database.

Generally speaking, because lenses used in digital cameras have spherical surfaces, pictures taken by digital cameras tend to be brighter in the center and darker in the periphery. Using the information included in the lens-shading JPEG file, luminance compensation gains that make up for the lens-shading effect of the target camera can be deduced.

The color chart JPEG file includes a first plurality of primitive output values respectively corresponding to the plurality of color patches of the color chart. Since in the color chart JPEG file, some of the color patches are located at the center, some are located near the center, and some are located near the edges, the abovementioned luminance compensation gains can be used to compensate the first plurality of primitive output values to obtain a first plurality of lens-compensated output values. Similarly, the gray level JPEG file includes a third plurality of output values respectively corresponding to a plurality of gray levels of the gray level chart. The luminance compensation gains can also be used to compensate the third plurality of output values to obtain a third plurality of lens-compensated output values.

Next, a Gamma table of the target camera can be deduced through interpolating the third plurality of lens-compensated output values. The Gamma table is then stored as a reference source gamma table database. According to the Gamma table, a de-Gamma curve of the target camera is deduced and allows a de-Gamma compensation to be performed on the first plurality of lens-compensated output values. After an optional white balance operation is performed, the first plurality of output values mentioned in step 120 is obtained. Finally, store the first plurality of output values as a reference source color database.

Figure 3:
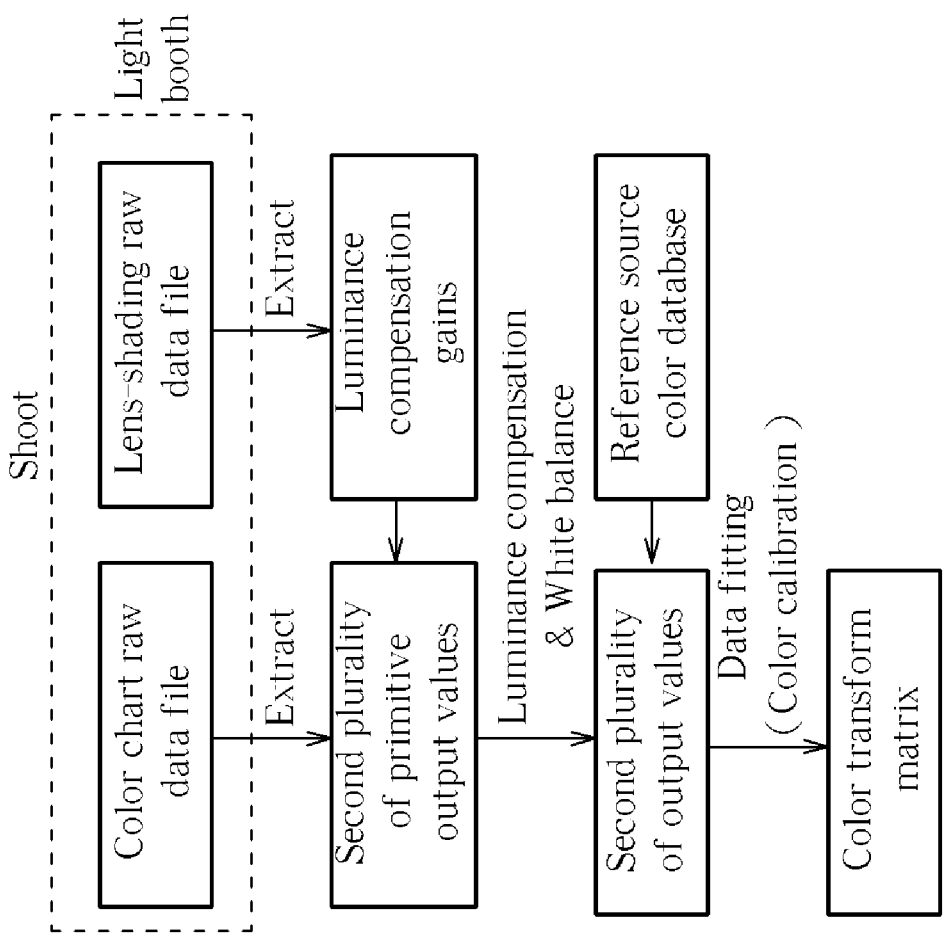

FIG. 3 is a schematic diagram illustrating steps 140 and 160 of FIG. 1 in more detail. First, under the fixed color temperature provided by the light booth, utilize the first camera to shoot the color chart to obtain a color chart raw data file and to take a lens-shading photo to obtain a lens-shading raw data file. Using the information included in the lens-shading raw data file, luminance compensation gains that make up for the lens-shading effect of the first camera can be deduced.

The color chart raw data file includes a second plurality of primitive output values respectively corresponding to the plurality of color patches of the color chart. The abovementioned luminance compensation gains can be used to compensate the second plurality of primitive output values. After an optional white balance operation is performed, the second plurality of output values mentioned in step 140 is obtained. The abovementioned part of FIG. 3 belongs to step 140 of FIG. 1, and the remaining part belongs to step 160 of FIG. 1. The second plurality of output values and the first plurality of output values of the reference source color database are compared to obtain a color transfer matrix. This comparing operation is also referred to as a color calibration operation. In short, if one of the second plurality of output values corresponding to a color patch of the color chart is multiplied with the color transfer matrix, ideally one of the first plurality of output values corresponding to the color patch will be generated. The color transfer matrix is a 3*3 matrix. For 16-bit color systems, only 18 bytes of memory space is required to store the color transfer matrix.

Figure 4:
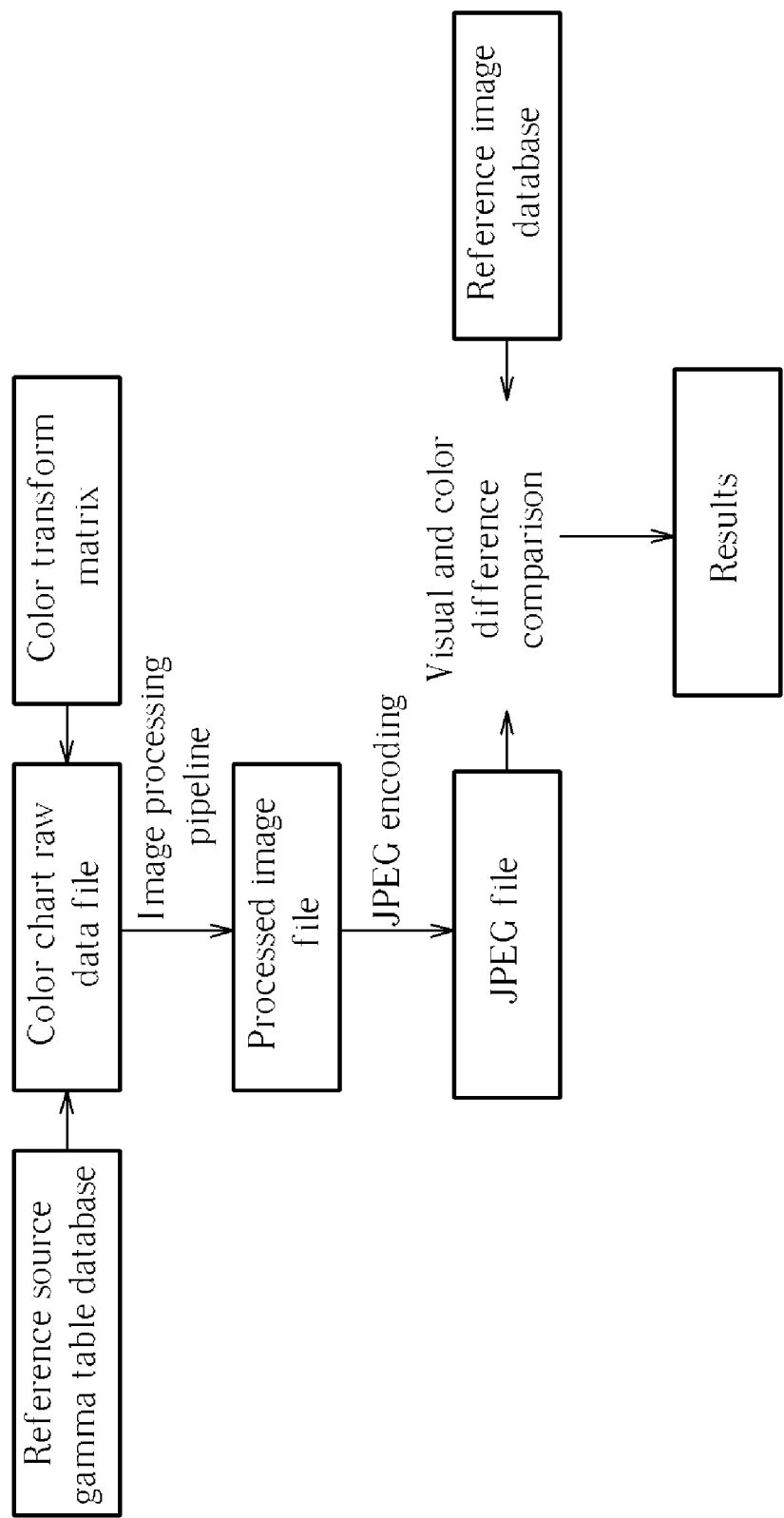

FIG. 4 is a schematic diagram illustrating step 180 of FIG. 1 in more detail. Herein the color chart raw data file generated by the first camera is used as an example. By applying the color transform matrix and the reference source gamma table database in an image-processing pipeline of the first camera, a processed image file is generated. And by performing a JPEG encoding procedure on the processed image file, a JPEG file is obtained. Although the JPEG file is generated by the first camera, the colors of the JPEG file approximate the colors of a similar JPEG file generated by the target camera. In other words, applying the color transform matrix in the image-processing pipeline of the first camera enables the first camera to emulate colors of target camera.

The lower right hand corner of FIG. 4 shows a result verification. When performing a visual and color difference comparison operation on the JPEG file and the reference image database, the comparing results reveal similarities between the colors of the first camera and that of the target camera. The comparing results can also be used to further revise the color transfer matrix, and therefore improve the emulation ability of the first camera.

Since the color domain represented by the plurality of color patches of the color chart covers most of the colors, by using the color chart as a shooting target, the embodiment allows the color transfer matrix to be accurately deduced. In one experiment, the method of the present invention was applied on several digital cameras and successful emulation results were achieved. In one camera, storing one 3*3 color transfer matrix enables the camera to emulate the colors of one target camera. By storing additional 3*3 color transfer matrixes, the camera is able to emulate the colors of more target cameras. Storing each 3*3 color transfer matrix requires only 18 bytes of space. Therefore a single camera can emulate colors of several other cameras and satisfy the preference of different users.

Furthermore, for each target camera, the color database for the target camera only has to be established one time. Based on the color database for the target camera, many other cameras can emulate the colors of the target camera.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for enabling an output device to emulate colors of a target camera, the method comprising the following steps:
    (a) utilizing the target camera to shoot a color chart to obtain a first plurality of output values respectively corresponding to a plurality of color patches of the color chart;
    (b) utilizing the output device to shoot the color chart to obtain a second plurality of output values respectively corresponding to the plurality of color patches of the color chart;
    (c) comparing the first plurality of output values with the second plurality of output values to deduce a color transform matrix; and
    (d) applying the color transform matrix in an image processing pipeline of the output device to enable the output device to emulate colors of the target camera;
    wherein step (a) further comprises:
    (a1) utilizing the target camera to shoot the color chart under a fixed color temperature to obtain a first plurality of primitive output values respectively corresponding to the plurality of color patches of the color chart, to shoot a gray level chart to obtain a third plurality of output values respectively corresponding to a plurality of gray levels of the gray level chart, and to take a lens shading photo;
    (a2) compensating the first plurality of primitive output values and the third plurality of output values according to the lens shading photo to obtain a first plurality of lens-compensated output values and a third plurality of lens-compensated output values; and
    (a3) de-gamma compensating the first plurality of lens-compensated output values according to the third plurality of lens-compensated output values to obtain the first plurality of output values.

2. The method of claim 1, wherein step (a3) further comprises:
    de-gamma compensating the first plurality of lens-compensated output values according to the third plurality of lens-compensated output values and performing a white-balance operation to obtain the first plurality of output values.

3. The method of claim 1, wherein step (b) further comprises:
    (b1) utilizing the output device to shoot the color chart under a fixed color temperature to obtain a second plurality of primitive output values respectively corresponding to the plurality of color patches of the color chart, and to take a lens shading photo; and (b2) compensating the second plurality of primitive output values according to the lens shading photo to obtain the second plurality of output values.

4. The method of claim 3, wherein step (b2) further comprises:

compensating the second plurality of primitive output values according to the lens shading photo and performing a white-balance operation to obtain the second plurality of output values.

5. The method of claim 1, wherein the color transfer matrix is a 3*3 matrix.

6. The method of claim 1, wherein the output device is a digital camera.

7. A method for enabling an output device to emulate colors of a target camera, the method comprising the following steps:

(a) utilizing the target camera to shoot a color chart to obtain a first plurality of output values respectively corresponding to a plurality of color patches of the color chart;

(b) utilizing the output device to shoot the color chart to obtain a second plurality of output values respectively corresponding to the plurality of color patches of the color chart;

(c) comparing the first plurality of output values with the second plurality of output values to deduce a color transform matrix; and (d) applying the color transform matrix in an image processing pipeline of the output device to enable the output device to emulate colors of the target camera;

wherein step (b) further comprises:

(b1) utilizing the output device to shoot the color chart under a fixed color temperature to obtain a second plurality of primitive output values respectively corresponding to the plurality of color patches of the color chart, and to take a lens shading photo; and (b2) compensating the second plurality of primitive output values according to the lens shading photo to obtain the second plurality of output values.

* * * * *